Dec. 25, 1962 H. PAULOS 3,070,046

SECURITY FILE CONSTRUCTION

Filed Aug. 16, 1960

9 Sheets-Sheet 1

INVENTOR.
Harry Paulos
BY
Frease, Bishop, Johns & Schick
ATTORNEYS

INVENTOR.
Harry Paulos
BY
Frease, Bishop, Johns & Schick
ATTORNEYS

Dec. 25, 1962

H. PAULOS 3,070,046

SECURITY FILE CONSTRUCTION

Filed Aug. 16, 1960

9 Sheets-Sheet 3

INVENTOR.

Harry Paulos

BY

Frease, Bishop, Johns & Schick

ATTORNEYS

Dec. 25, 1962

H. PAULOS 3,070,046

SECURITY FILE CONSTRUCTION

Filed Aug. 16, 1960

9 Sheets-Sheet 4

INVENTOR.

*Harry Paulos*

BY

*Frease, Bishop, Johns & Schick*

ATTORNEYS

Dec. 25, 1962 H. PAULOS 3,070,046

SECURITY FILE CONSTRUCTION

Filed Aug. 16, 1960

9 Sheets-Sheet 5

INVENTOR.
*Harry Paulos*
BY
*Frease, Bishop, Johns & Schick*
ATTORNEYS

INVENTOR.
Harry Paulos
BY
Frease, Bishop, Johns & Schick
ATTORNEYS

INVENTOR.
Harry Paulos
BY
Frease, Bishop, Johns & Schick
ATTORNEYS

Dec. 25, 1962 H. PAULOS 3,070,046

SECURITY FILE CONSTRUCTION

Filed Aug. 16, 1960

9 Sheets-Sheet 8

INVENTOR.
Harry Paulos
BY
Frease, Bishop, Johns & Schick
ATTORNEYS

INVENTOR.
Harry Paulos
BY
Frease, Bishop, Johns & Schick
ATTORNEYS

United States Patent Office 3,070,046

Patented Dec. 25, 1962

3,070,046

SECURITY FILE CONSTRUCTION

Harry Paulos, Canton, Ohio, assignor to Diebold, Incorporated, Canton, Ohio, a corporation of Ohio Filed Aug. 16, 1960, Ser. No. 49,875
23 Claims. (Cl. 109—29)

This invention relates to security file containers and more particularly it pertains to a file construction intended primarily to deny surreptitious entry of a file container and to prevent theft or compromise or documents by skilled operators without leaving evidence of the entry.

The primary use of a security file container is for the storage and protection of articles or papers containing information, such as classified matter or documents pertinent to national defense and security or to public welfare. Protection against forcible entry as well as against fire is of secondary interest.

A surreptitious entry of a file container is an entry that is made secretly and without proper authority. Such an entry is usually accomplished by highly skilled unauthorized persons who leave no evidence of entry. Many such entries may be performed over an extended period of time without being detected, such as acts of espionage. Indeed, it is sometimes more important to know that an entry has been made than it is to prevent such entry.

Most security file containers of prior construction used primarily for storage of classified matter, such as documents important to national defense and security or to public welfare, have been provided with manipulation-resistant combination locks that provide a choice of hundreds of thousands of effective combinations. However, most prior file containers have had combination locks mounted on the interior surface of the front panel of a drawer, or the lock was located at the front side of the container where it was accessible for surreptitious entry.

It is well known among those skilled in the art that access may be had to manipulate a combination lock which is located on the interior side of the front panel of the drawer such as by drilling through the front panel for gaining access into the lock so as to see, feel, or otherwise detect the combination. Where the drill holes are subsequently concealed or covered adequately such an entry is surreptitious because it will not be detected. As a result prior file containers having combination locks located adjacent the interior side of the front panel have proven unsatisfactory for defeating surreptitious entry taking place within twenty minutes time.

Associated with the foregoing disadvantage is the fact that a combination lock mounted on the interior surface of the front panel of a drawer may be manipulated successfully by an unauthorized person who discovers the combination by obtaining pictures of the lock tumblers by radiological attack. Again, successful entry of the file container made by the use of scintillation, X-ray, or radiographic means would be surreptitious because no evidence of the entry would be provided. Suffice it to say, all prior files have been entered one way or another in a period of not more than twenty minutes by a skilled unauthorized person.

It has been found that the foregoing disadvantages may be overcome by locating the combination lock at a position centrally of the file and remote from the outer walls including the front drawer panels. Many advantages are obtained by placing the combination lock together with its associated locking means internally of the file. In the first place, the lock is no longer readily accessible by drilling through the front panel of a drawer or through any other wall of the file in order to manipulate the lock or otherwise detect its combination. Where the lock is located centrally within the file it is inaccessible for manipulation by drilling at a strategic location through any outer surface of the file.

Moreover, by placing the combination lock centrally within the file, the use of X-ray or radiographic means for taking pictures of the lock tumblers is highly improbable. Where the lock was mounted on the inner side of the front panel of a drawer the success of a picture was assured because the source of X-ray or radiographic means could be located behind the back wall of the file and the film for the picture could be placed against the outer surface of the front panel relatively close to the lock. However, the success of such pictures is directly dependent upon the distance between the source of the X-ray or radiographic means and the object, so that location of the lock centrally within the file and remote from the front panel greatly increases the distance between the lock and the source of X-ray or radiographic means, making the taking of a picture practically inpossible.

Ordinarily, prior file containers, having a number of drawers, have been secured by one combination lock that is mounted on the interior surface of the front panel of one of the drawers. Various disadvantages of such a construction have been discovered which have rendered the file container susceptible to surreptitious entry. Among other things, the location of the combination lock on the interior surface of the front panel of a drawer has proven ultimately impracticable because none of the drawers can be locked unless the drawer having the combination lock is completely closed.

The device of the present invention is so constructed that none of the drawers can be locked unless all of the drawers are locked or unless any unlocked drawer is locked out a minimum of three inches from the front side of the file container where it is readily apparent by only a casual glance so that the discrepancy can be corrected.

In accordance with the invention, in addition to locating the combination lock centrally within the file container, the lock is mounted in a removable lock drawer. Such a drawer is normally locked in place by a locking mechanism associated with the combination lock, and is removable only when the file container is unlocked. An advantage of mounting a combination lock in a removable lock drawer is that the lock may be removed for maintenance or for changing the combination more readily than is otherwise possible.

Moreover, authorized personnel may be provided with one or more additional drawers to expedite the changing of the combination of the lock when necessary. Likewise, when a part of the combination lock or of the associated locking mechanism becomes defective and is in need of repair, the drawer having the defective part may be removed and replaced by an operative drawer without undue delay.

In addition, it has been found that if in addition to a dial for manipulating the combination lock, a locking shaft is provided for turning the associated locking mechanism between locked and unlocked positions, which shaft is provided with an external handle, it is possible to provide the file with readily visible evidence to an observer of the locked or unlocked condition of the file when all of the file drawers are closed. Thus, when the handle is horizontal the file is unlocked and when it is vertical with all the drawers closed the file is locked.

Entry of a file container may be made surreptitiously also by cutting through the side, rear, top, or bottom walls of the container, thereby circumventing the necessity of manipulating the combination lock. Highly skilled technicians provided with power tools, hand tools and other devices have made successful entries into file containers without mutilating the contents in a manner which is evident to qualified personnel. Such entries have been considered successful where a part of a file wall is destroyed or removed and restored to its original appearance by replacement or repair without being detectable by qualified personnel.

In the past, major reliance has been placed on drill-resistant metal. Due to improvements in metal cutting tools and techniques, however, reliance on drill-resistant metal has proven undependable.

Inasmuch as a surreptitious entry is not a forceful entry but is dependent rather upon the skills of the unauthorized entrant, it has been found that a more satisfactory security file container can be provided where greater lock protection and greater perimeter protection are built into a container. With regard to the perimeter protection, the ability to surreptitiously enter a file container through a wall of the file is minimized by installing an envelope containing an odoriferous dye fluid within the entire perimeter of the file container. It has been found that an envelope composed of spaced sheets of metal that are seam-welded at their peripheries to form a fluid chamber may be installed within the side, top, and bottom walls of the file, as well as within the front panels of each drawer. By providing such an envelope it is impossible to obtain access to the contents of a file container through the walls without breaking the envelope, which permits a gas to escape into the area containing the file container. The gas, having a characteristic for lingering in the atmosphere for an extended period of time, is detected by an authorized person who subsequently enters the area and is thereby advised that an unauthorized attempt has been made to enter the file container.

In addition to being odorifierous, the fluid also has coloring characteristics. When it escapes from the envelope the fluid leaves a tell-tale discoloration on adjacent articles such as on the outer wall of the file where the attempted entry is made or on papers contained in the file.

In addition to providing an envelope containing a gas chamber, a wire mesh is installed within the chamber to further defeat any attempt to enter the file through the envelope without the fluid escaping. Without the wire mesh in the chamber it is conceivable that a would-be entrant could obtain access to the contents of the file through the envelope by pressing the sheets forming the envelope tightly together with a ring of sufficient diameter, causing the abutting portions of the sheet to be welded together by applying heat to the ring, and then cutting away the center portions of the sheets within the circular weld, whereby the envelope could be penetrated without causing the gas to escape. On the other hand, with an envelope containing a wire mesh coextensive with the chamber, the sheets forming the envelope cannot be welded completely together in a fluid-sealing circle because the sheets cannot be pressed together sufficiently tight at the locations of the wire mesh to prevent the escape of some fluid from the envelope.

Accordingly, it is a general object of this invention to provide a file container which defeats surreptitious entry such as indulged in by espionage agents.

It is another object of this invention to provide a file container having a single combination lock located at a position spaced from the front panel of any drawer of the container.

It is another object of this invention to provide a file container having a combination lock which is spaced from access for manipulation by unauthorized personnel.

It is another object of this invention to provide a file container having a combination lock and associated lock mechanisms mounted in a removable drawer.

It is another object of this invention to provide a file container having a combination lock and associated locking mechanisms mounted in a removable drawer which is not removable unless an adjacent drawer is also opened.

It is another object of this invention to provide a file container having a locking mechanism which cannot be actuated into the locked position unless all drawers are thereby locked or any unlocked drawer is locked out a minimum of three inches from the front of the file container so as to be readily visibly unlocked.

It is another object of this invention to provide a file container having perimeter protection which includes liner envelope means of odoriferous fluid which extends over the entire inner walls of the container.

It is another object of this invention to provide a file container having perimeter protection including a liner container of odorifierous fluid which when penetrated due to an attempt to enter the file through a wall emits a distinctive odor that penetrates the surrounding atmosphere.

Finally, it is an object of this invention to provide an improved file container which substantially eliminates the disadvantages enumerated and which obtains the foregoing desiderata in a simple and effective manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, preferred embodiments of which—illustrative of the best modes in which applicant has contemplated applying the principles—are set forth in the following description and shown in the drawings, and which are particularly and distinctly pointed out and set forth in the appended claims forming part hereof.

The improved file container of the present invention may be stated in general terms as including a file container having walls containing a plurality of file drawers, locking means for the file including a combination lock centrally disposed within the container between a pair of intermediate file drawers, the combination lock being spaced inwardly from the front panel of the file, a dial spindle on the front panel having an elongated shaft extending to the combination lock, the locking means also including a lock assembly operatively connected with the combination lock and including a locking lug movable between locked and unlocked positions with respect to each drawer, and envelope means within the walls of the file including the front panels of the file drawers and providing a fluid-containing chamber, whereby entry of the file container through a wall is impossible without piercing the envelope means.

The preferred embodiments of the invention are illustrated by way of example in the accompanying drawings wherein.

Similar numerals refer to similar parts throughout the several views of the drawings.

Figures 1, 2, 9:
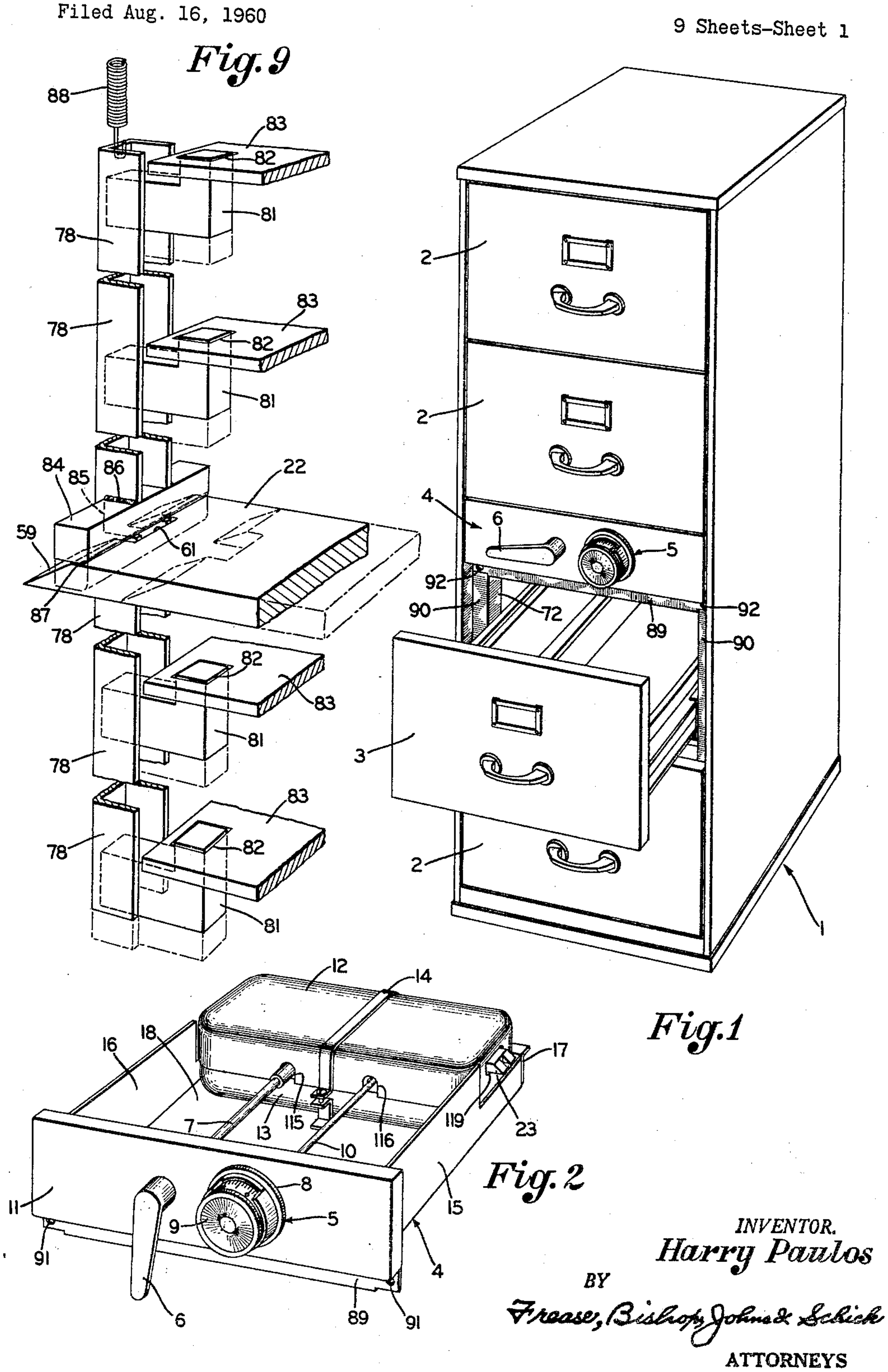
FIGURE 1 is a perspective view of the file container having one drawer open and having the lock handle in unlocked position.
FIG. 2 is a perspective view of the lock drawer showing the lock handle vertically disposed in the locked position and showing one lift bolt in the locked position.
FIG. 9 is a perspective view of the lock bar assembly showing the lift bolt in the extended (locked) position for lifting the lock hooks on the lock bar into locking engagement with lock plates on each drawer, and showing the lift bolt, etc. in the retracted (broken line) position.

A first embodiment of the invention is shown in FIGS. 1–14, 23–26, and a second embodiment is shown in FIGS. 10–26. In FIG. 1 a file container or file of the first embodiment is generally indicated at 1 and includes a plurality of similar drawers 2 and 3, drawer 3 of which is in the open position. The file 1 is also provided with a lock drawer 4, on the front panel of which is provided a dial 5 for a combination lock and a locking handle 6 which is disposed in the horizontal position, signifying that the file is unlocked. As shown in FIG. 1, the lock drawer 4 is centrally disposed within the file 1 between upper and lower drawers 2 and 3.

The lock drawer 4 is shown in FIG. 2 with the handle 6 vertically disposed in the locked position. The handle 6 is mounted on the outer end of an elongated shaft 7. The dial 5 includes a dial ring 8 and a dial spindle 9, the latter of which is mounted on the outer end of a shaft 10. Both shafts 7 and 10 extend from a front panel 11 of the drawer 4 to locking means disposed at the rear of the drawer 4 and contained within a lock housing including a lid portion 12 and a body portion 13 which are held together by a strap clamp 14. The drawer 4 includes opposite side walls 15 and 16, a rear wall 17, and a bottom wall 18 on which the bottom portion 13 of the lock housing is mounted.

Figure 5:
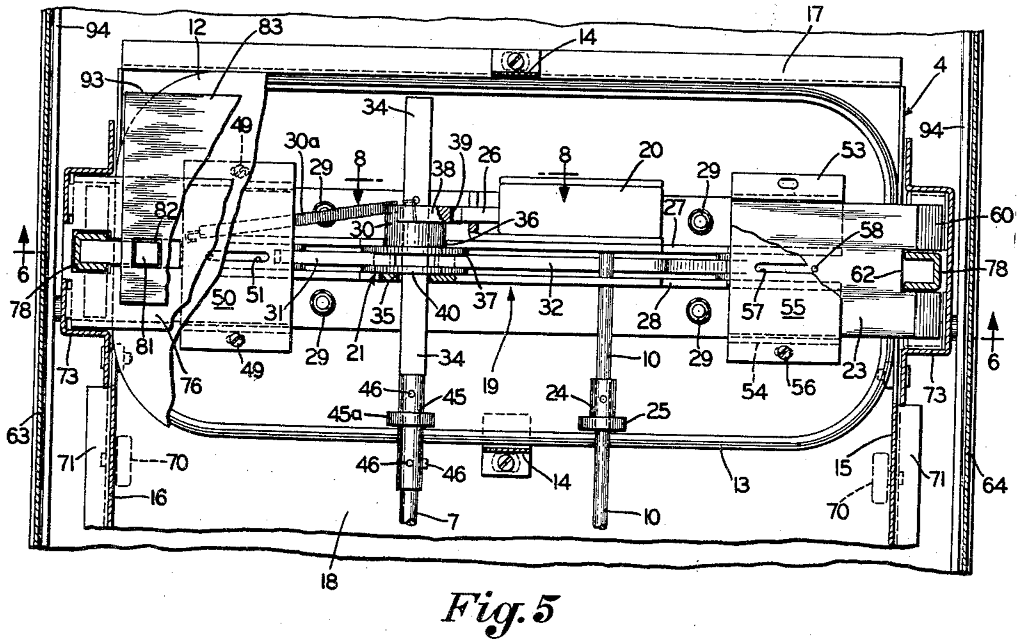
FIG. 5 is a horizontal sectional view, partially broken away, showing the locked assembly with the lift bolts extended in the locked position.
Figure 6:
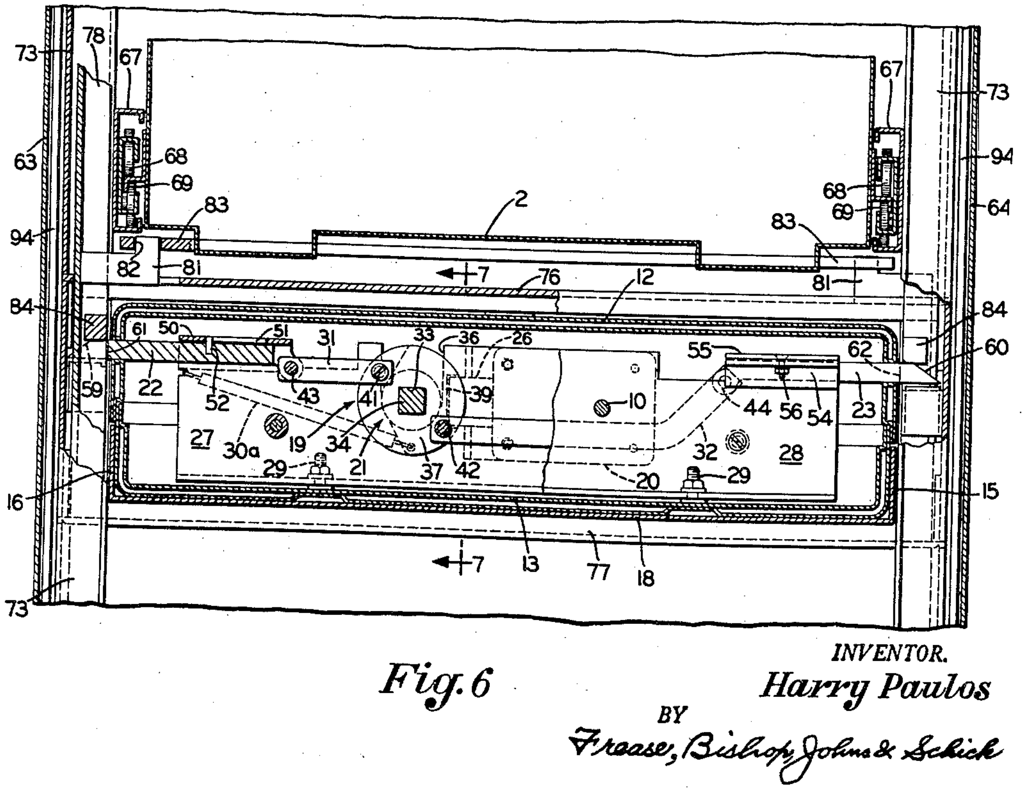
FIG. 6 is a vertical sectional view of the lock assembly, taken on the line 6—6 of FIG. 5.
Figure 7:
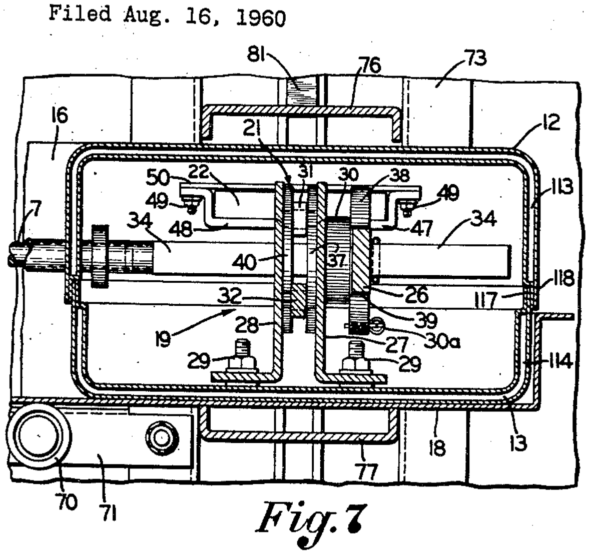
FIG. 7 is a vertical sectional view of the lock assembly, taken on the line 7—7 of FIG. 6.

The locking means which is generally indicated at 19 in FIGS. 5, 6, and 7 includes a combination lock 20, a lock toggle assembly 21, as well as a pair of oppositely disposed lift bolts or cams 22 and 23. The lock 20 is a conventional manipulation-resistant combination lock that provides a choice of more than one million effective combinations. The lock 20 is disposed at the inner end of the shaft 10. As shown in FIG. 5, a sleeve 24 is mounted on the shaft and is provided with a peripheral flange 25 to prevent the insertion of an elongated probe into the combination lock 20, which probe could be inserted through a clearance space between the outer end portion of the shaft and the front panel 11 of the drawer 4 upon removal of the dial spindle 9. In addition, the combination lock 20 is provided with a conventional bolt 26.

Figure 8:
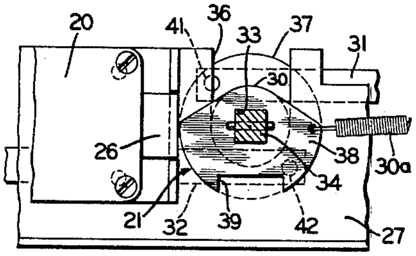
FIG. 8 is a fragmentary enlarged vertical sectional view, taken on the line 8—8 of FIG. 5, but showing the assembly in the unlocked position.

The lock toggle assembly 21 is shown more particularly in FIGS. 5–8. The assembly is supported by a pair of spaced mounting plates 27 and 28 which are L-shaped members (FIG. 7) secured in place by similar nut and bolt assemblies 29. The toggle assembly 21 includes a lock cam 30, a pair of links 31 and 32, as well as the lift bolts 22 and 23. The lock cam 30 is a sleeve member having a square central bore 33, and is mounted on a square shaft 34 extending through and between a round aperture 35 in the plate 28 (FIG. 5) and a U-shaped notch 36 (FIG. 6) in the mounting plate 27. The lock cam 30 also has a flange 37. As shown in FIG. 5, the sleeve extends through the notch 36 in the mounting plate 27 and the flange 37 is disposed between the mounting plates 27 and 28. In addition, the lock cam 30 includes a flange 38 at the end of the sleeve portion opposite the flange 37, which flange 38 extends toward the bolt 26 of the combination lock 20 and is provided with a bolt-receiving notch 39 as shown in FIGS. 5 and 8. In addition, a cam disk 40 is attached to the flange 37 by two spacer pins 41 and 42 and the flange 40 is disposed adjacent the mounting plate 28 as shown in FIGS. 5 and 7.

The link 31 is pivotally mounted on the pin 41 at one end and at the other end is pivotally mounted on a pin 43 (FIG. 6) on the inner end of the lift bolt 22. Likewise, the link 32 is pivotally connected to the lock cam 30 by the pin 42 at one end and at the other end to the lift bolt 23 by a pin 44. Accordingly, when the lock handle 6 is rotated between the locked and unlocked positions, the shaft 7, which is connected to the square shaft 34 by a coupling 45 having similar set screws 46 (FIG. 5), rotates the lock cam 30 which in turn moves the lift bars 22 and 23 between retracted and extended (locked) positions in a manner conventional to toggle operations.

As shown in FIGS. 5–8, a coil spring 30*a* extends between the lock cam 30 and the mounting plate 27 for rotating the toggle assembly to the unlocked position when the bolt 26 of the lock 20 is retracted, whereby the handle 6 on the front of the file 1 is turned automatically from the vertical to horizontal position. Accordingly, the spring 30*a* in its contracted position holds the locking means in the unlocked condition and to lock the file it is necessary to manually rotate the handle 6 to the vertical position and then actuate the bolt 26 into the notch 39 (FIG. 8) by manipulation of the dial spindle 9.

In FIGS. 5, 6, and 7, the lift bolt 22 is slidably mounted upon a pair of flanges 47 and 48 extending outwardly from the upper sides of the mounting plates 27 and 28, respectively, and which at their outer extremities are apertured to receive similar bolts 49 for holding the retainer plate 50 in place with the lift bolt 23 slidably disposed between said plate and said flanges. As shown in FIGS. 5 and 6, the plate 50 is provided with a guide slot 51 in which a guide pin 52 is slidably mounted to prevent the lift bolt 32 from binding between the flanges 47, 48, and the plate 50.

In a similar manner the lift bolt 23 is mounted upon a pair of flanges 53 and 54 at the upper ends of the mounting plates 27 and 28, respectively, and a retainer plate 55 is secured to the upper ends of the flanges 53 and 54 by similar bolts 56. The plate 55 is also provided with an elongated guide slot 57 for guiding the movement of a pin 58 extending upwardly through the slot 57 from the lift bolt 23 in a manner similar to the pin 52 on the bolt 22. Finally, as shown in FIGS. 3, 5, and 6, the bolts 22 and 23 have outer inclined end portions 59 and 60 as well as rectangular shaped notches 61 and 62, respectively.

Figure 3:
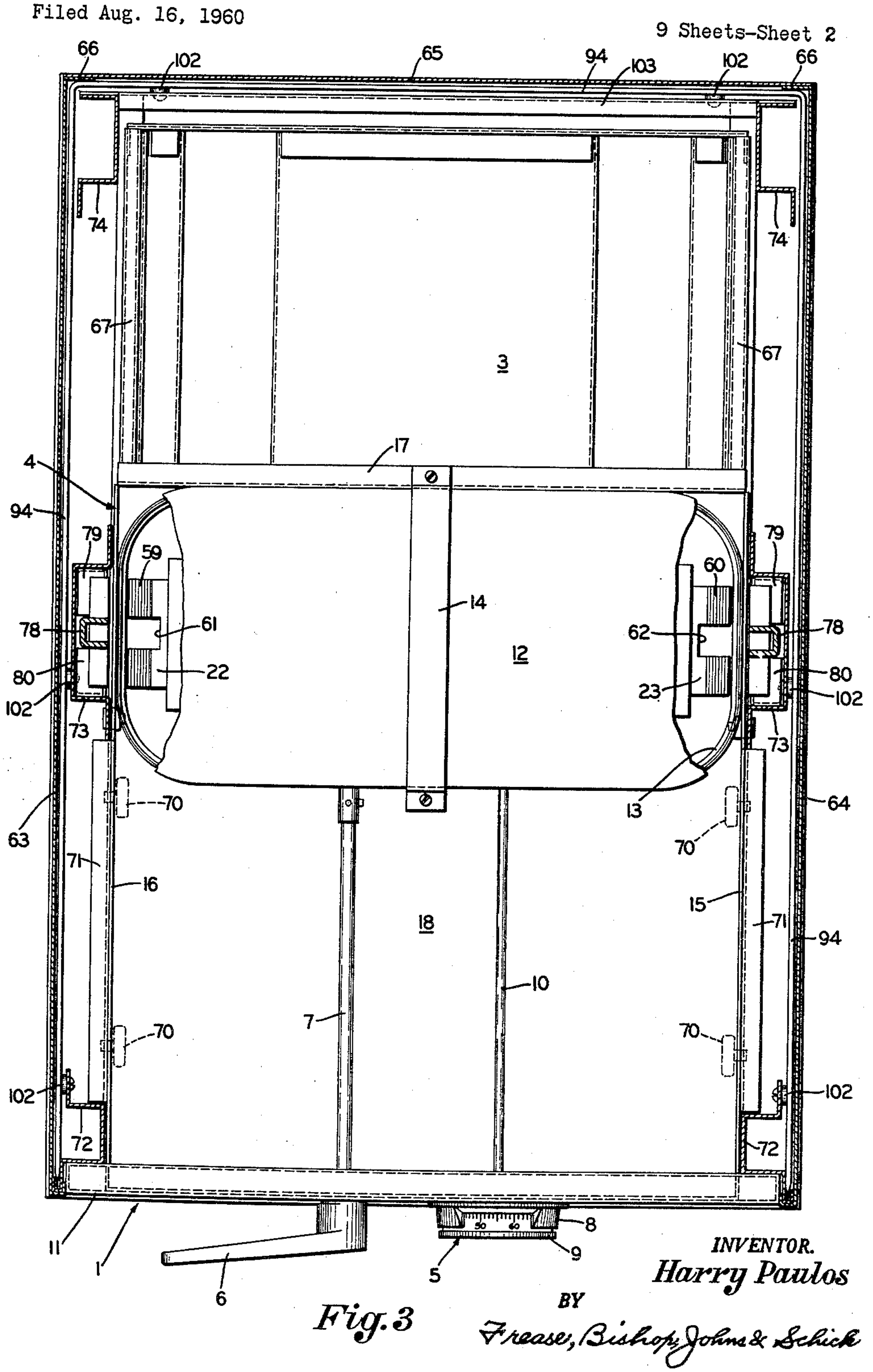
FIG. 3 is a horizontal sectional view through the file container showing the lock drawer in the closed unlocked position within the file.

In FIG. 3, the outer surface of the file is bounded by outer wall members 63 and 64 on opposite sides and by a wall member 65 on the rear side of the file, all of which wall members are preferably composed of sheet metal having overlapping flanges at adjoining ends by similar flanges 66 which are secured together in suitable manner such as by spot welding. The drawers 2 and 3 are supported at spaced intervals by similar horizontally disposed track members 67 of conventional construction in which track rollers 68 and 69 are provided to facilitate opening and closing of the drawers.

Figure 4:
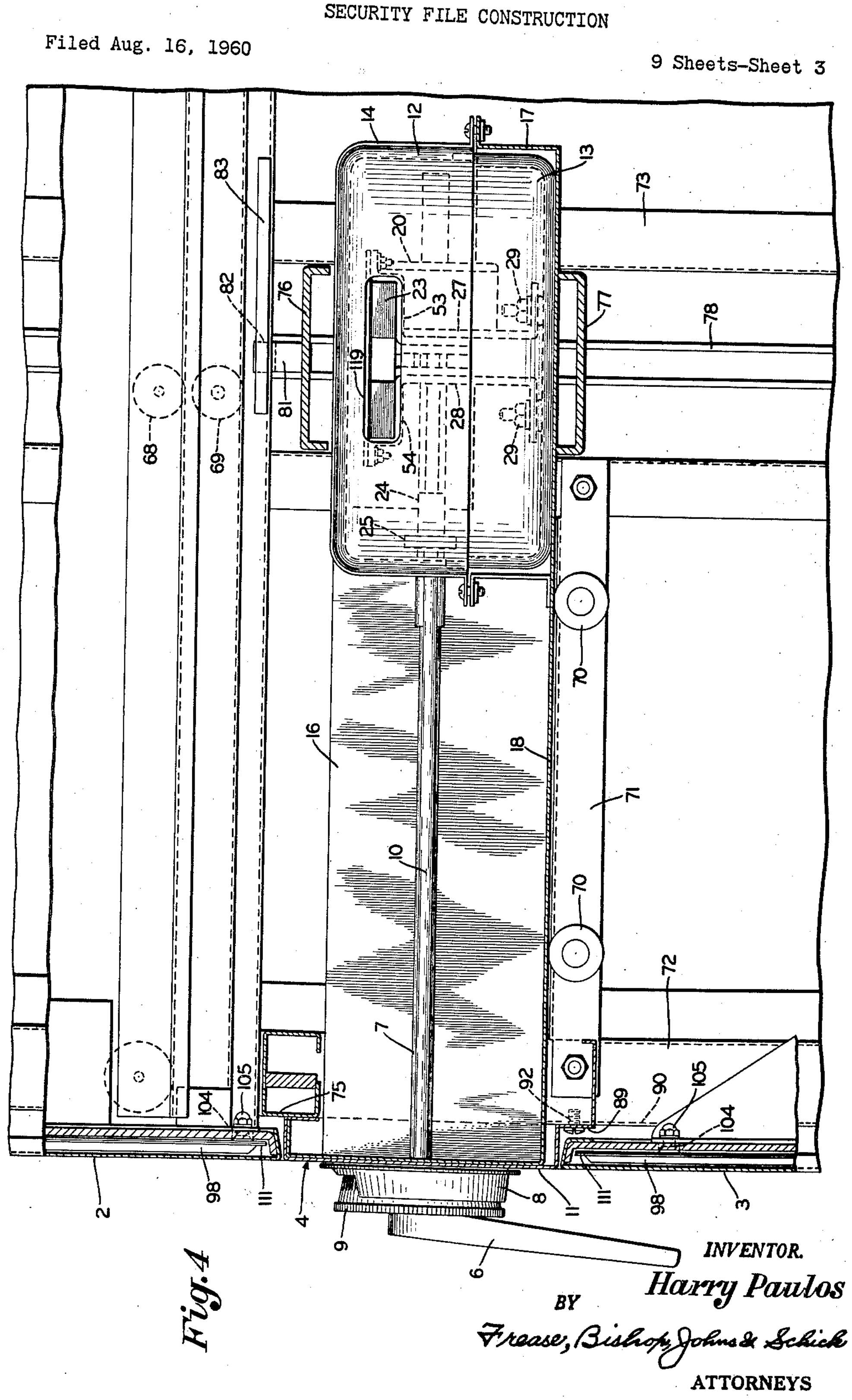
FIG. 4 is a vertical sectional view showing the lock drawer within the file container with the lock handle vertically disposed in the locked position.

In FIGS. 3 and 4 the bottom wall 18 of the lock drawer 4 is mounted on a pair of longitudinally spaced rollers 70 which are mounted on horizontal members 71. The tracks 67 and the members 71 are mounted on spaced vertical posts 72, 73, and 74 which reinforce the file and maintain the rectangular configuration thereof. A horizontal reinforcing member 75 extends between the front posts 72 (FIG. 4) and a pair of upper and lower channel members 76 and 77 are horizontally disposed between the posts 73 as shown in FIGS. 3 and 4. In FIG. 3 similar lock bars 78 are disposed within the channel-shaped posts 73.

Each lock bar 78 is a channel-shaped member (FIG. 9) and is slidably mounted within the vertical post 73 where it is held in place between spaced brackets 79 and 80 within the channel on opposite sides of the bar. Similar brackets 79 and 80 are located at spaced vertical intervals along each bar 78 for preventing the bar from moving sideways out of alignment with the notches 61 and 62 of the lift bolts 22 and 23, respectively.

At spaced intervals along the bar comparable to the height of the drawers 2 and 3 a lock member or hook 81 (FIG. 9) is secured on the bar for each drawer. Each hook 81 is secured, such as by welding, within the channel of the lock bar 78 and the upturned portion of each hook 81 moves upwardly with the bar into locking position within a hook-receiving aperture 82 in a lock plate 83 which is situated across the undersurface of each drawer as shown in FIG. 6.

The lock bar 78 is provided with a lock bolt 84 that extends through similar notches 85 through the channeled bar 78 and is secured in its horizontal position by welding such as a weld 86. Each lock bolt 84 cooperates with the corresponding lift bolts 22 and 23 for moving the lock bars 78 vertically into and out of locking position with the drawers. As shown in FIG. 9, when the lift bolt 22 is in the retracted (broken line) position, the lock bolt 84 and the lock bar 78 are at lowermost (broken line) positions. When the lift bolt 22 is moved from the retracted to the extended (locked) position, upon counterclockwise rotation of the handle 6, the inclined end portion 59 of the bolt moves under a rounded corner 87 of the bar 84 and the bar is raised as the inclined end portion moves outwardly to the fully extended (solid line) position, raising the lock bar 78 to the locked position and engaging the upper ends of the hooks 81 within the hook-receiving apertures 82 of the lock plates 83.

To facilitate lifting of each bar 78 with the hooks 81, a spring 88 is attached to the upper end of the bar which counterbalances a portion of the weight of the bar and the hooks. In addition to locking the several drawers 2 and 3 in place when the lift bolt 22 is in the fully extended position as shown in FIG. 9, the lock drawer 4 is also locked in place when each notch 61 and 62 of the lift bolts 22 and 23 move into position around the bars 78. Accordingly, when the file is locked all of the drawers including the lock drawer 4 are secured in place.

As shown in FIG. 4, the front panel 11 of the lock drawer 4 is provided with a lower flange 89 that is spaced inwardly from the outer front surface of the drawer, which flange is in abutment with a flange portion 90 of the vertical post 72 on each side of the drawer. The flange 89 and the flange portion 90 are provided with aligned apertures similar to the apertures 91 in the flange 89 (FIG. 2) for the insertion of similar metal screws 92 for holding the lock drawer 4 in position at all times when the file is unlocked and the drawer 3 is open. As shown in FIG. 4, when the file is locked and the drawer 3 is closed, the upper end of the front panel of said drawer extends over the flange 89 and the screws 92.

In FIGS. 4 and 5, the lock plate 83, being secured to the undersurface of each drawer 2 and 3, has a width which is considerably greater than would otherwise be necessary for providing the hook-receiving apertures 82. The greater width of the plates 83 facilitates detection of unlocked drawers which may occur from time to time due to inadvertence of authorized personnel. The aperture 82 for the partially open drawer will not be aligned with the corresponding hook 81 so that the upper end of the hook will contact the undersurface of the plate 83 and prevent completion of the locking operation. Any experienced operator will immediately recognize the discrepancy and after pushing all of the drawers completely closed a second attempt to turn the handle to the vertical locked position will be completed because with all the drawers completely closed the several apertures 82 will be in alignment with all of the hooks 81.

On the other hand, if for any reason a drawer such as drawer 3 should be open for a distance greater than the distance between the aperture 82 and the back edge 93 (FIG. 5) of the plate 83, which distance may be three inches or more, the plate 83 will not interfere with the upward movement of the hook 81 when the file is locked. However, when a drawer such as the drawer 3 is open for three or more inches, it is readily apparent and the file can be unlocked and relocked after the drawer is returned to the completely closed position. As an additional precaution for any authorized personnel who makes a security check of the file 1, the outer surfaces of the flanges 89 and 90 can be painted with a bright colored paint different from the color of the exterior of the file, thereby providing an additional indication that the open drawer 3 should be rectified before all authorized personnel leave the premises.

In order to provide a file 1 which is completely resistant to surreptitious entry for at least two hours, the outer walls of the file are provided with a shielding envelope contained within the outer surfaces of the walls. As shown diagrammatically in FIG. 10, a plurality of shielding envelopes 94, 95, 96, 97, and 98 are provided in the walls of the file. Each envelope is coextensive with the entire surface of the wall in which it is mounted.

The envelopes 94 and 95 have preferably a channel shape and are coextensive with opposite side walls as well as the rear wall of the file, and although the two channel-shaped envelopes 94 and 95 are provided, it is understood that a single envelope would serve the same purpose.

Figure 26:
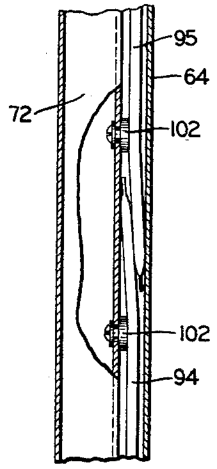
FIG. 26 is a fragmentary vertical sectional view through a central front portion of the side wall showing the upper envelope section overlapping the lower envelope section.
Figure 25:
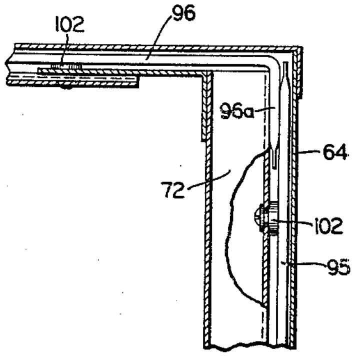
FIG. 25 is a fragmentary vertical sectional view through an upper front corner of the file container showing the top envelope overlapping the side envelope.

Likewise, the upper envelope 96 which covers the top wall of the file has downturned side and rear flange portions 96a (FIG. 10) which overlap (FIG. 25) the upper portions of the channel-shaped envelope 95. The envelopes 94 and 95 have similar overlapping edge portions when assembled as shown in FIG. 26. The lower envelope 97, being completely disposed within the bottom wall (FIG. 14), is preferably a completely flat member although it may be of the same configuration as the upper envelope 96 having the downturned flange portions 96a.

Figure 11:
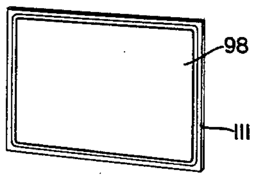
FIG. 11 is a perspective view of one gas envelope for the front panel of a drawer.
Figure 12:
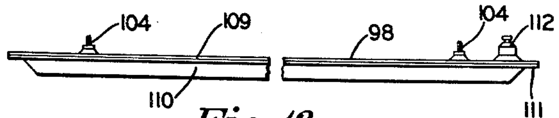
FIG. 12 is a top plan view of the envelope shown in FIG. 11.
Figure 13:
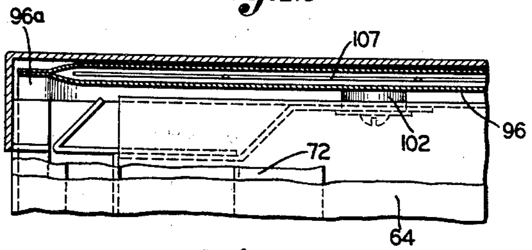
FIG. 13 is an enlarged fragmentary vertical sectional view showing the envelope in the top wall of the file container.
Figure 14:
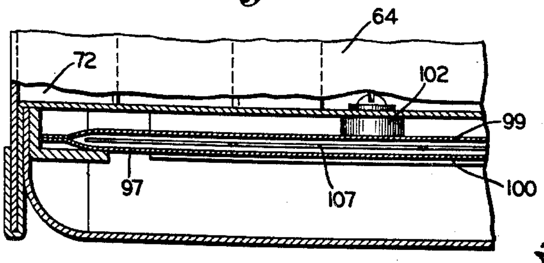
FIG. 14 is an enlarged fragmentary vertical sectional view showing the envelope disposed in the bottom wall of the file container.
Figure 10:
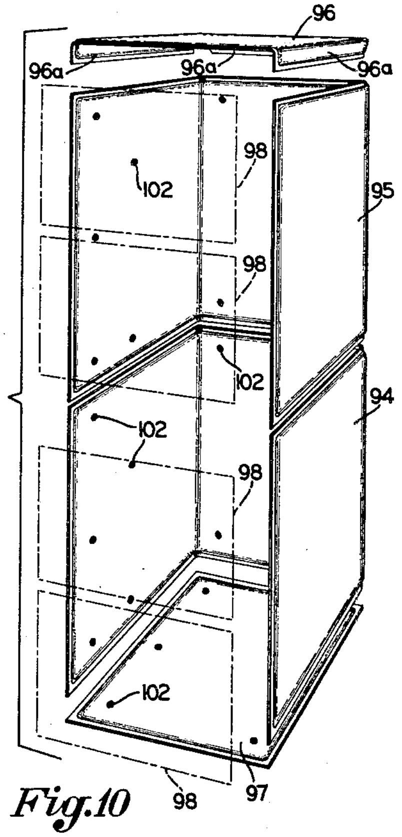
FIG. 10 is an exploded view of the protective gas envelopes within the outer walls of the file container and their location (broken line) in the front panels of the drawers when open.

Each drawer 2 and 3 is also provided with one envelope 98 (FIG. 4) in the front panel, which envelope is shown more particularly in FIGS. 11 and 12 and which is shown merely by broken lines in FIG. 10 in order not to obstruct the perspective view of the other envelopes 94–97. Each envelope 94–97 is composed primarily of two spaced sheets of metal 99 and 100 such as shown in FIGS. 23 and 24, the outer peripheries 101 of which are sealed together by welding in a fluid-tight manner with sufficient adhesion to contain gas or fluid within the envelope.

The sheets 99 and 100 are composed preferably of type 321 stainless steel having a thickness of .008–.009" which is of sufficient thickness to contain an odorous dye fluid within the chamber formed by the sheets. However, the sheets are thin enough to be easily ruptured during an entry through an outer wall.

The envelopes 94–97 are provided with spaced threaded nuts or bosses 102 as shown in FIGS. 3, 10, 13, and 14, by which the envelopes are secured in place by attachment to the vertical posts 72–74 and the several interconnecting horizontal reinforcing members, such as a member 103 extending between the rear vertical posts 74 (FIG. 3). The envelopes 98 in the drawer panels, however, are provided with threaded pins 104 (FIG. 12) by which, together with nuts 105 (FIG. 4), the envelopes 98 are secured in place.

Figure 23:
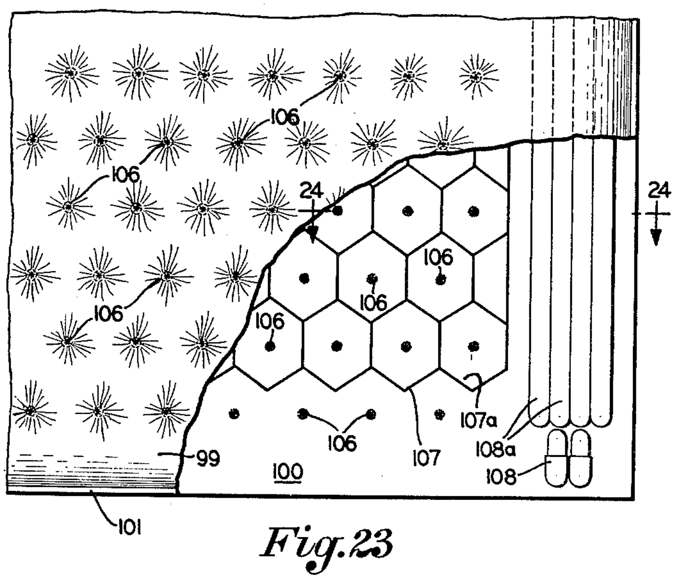
FIG. 23 is an enlarged fragmentary plan view, partly in section, of one of the envelopes, showing the wire mesh spacer between the opposite sides of the envelope.
Figure 24:
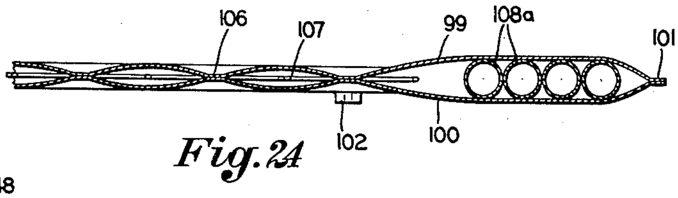
FIG. 24 is a vertical sectional view taken on the line 24—24 of FIG. 23.

In addition the envelopes 94–97, having relatively large side surfaces and being composed of relatively thin sheet metal, are spot welded together at spaced locations 106, as shown in FIG. 23. A wire mesh 107, such as chicken wire having openings 107a having a diameter of approximately one inch, is disposed between the metal sheets 99 and 100 with the spot welds 106 substantially centrally disposed between the wire segments forming the wire mesh to hold the sheets apart to provide a chamber within the sealed peripheries 101 of each envelope. It is assumed that access to any material in the file cannot be had through an opening less than one inch in diameter.

Each envelope 94–98 serves as a shielding means to prevent surreptitious entry into a file through the walls because the chamber formed by each envelope is filled with an odoriferous dye fluid having the characteristics of a distinct odor and a readily visible dye. Accordingly, in the event that an envelope is ruptured during an unauthorized entry, the fluid immediately escapes from the chamber and fills the immediate area with a readily detectable distinct odor that lingers in the atmosphere for an indefinite time under normal ventilating conditions and thereby warns returning authorized personnel that an attempted surreptitious entry has occurred. In addition, the escaping fluid is readily visible because the dye leaves its distinctive color on everything it contacts, including papers and other material contained in the file.

During manufacture of the envelopes after the peripheral seal 101 has been performed except for a maximum of a two-inch opening, one or more capsules 108 of dye crystal powder are inserted into the envelope through the opening. The powder is crystal violet and contains Tinopal which is fluorescent. Thereafter glass vials 108a containing the odor-producing characteristics are inserted into the envelope, after which the entire chamber is filled with a solvent such as propylene glycol and the two-inch opening is closed by completing the peripheral seal 101.

Each capsule 108 containing the crystal violet and Tinopal is dissolvable in the propylene glycol solution. On the other hand, the glass vials 108a, containing the odor-producing ingredients, are broken by compressing the end portions of the envelope together with sufficient force to break the vials 108a. The odoriferous ingredients within the vial are released and dissolve uniformly in the solution of propylene glycol.

The preferred composition of the entire fluid within each envelope 94–98 is as follows:

| | Percent |
|---|---|
| Allyl isothiocyanate | 2.1 |
| Benzyl mercaptan | 3.6 |
| n-Butyric acid | 17.9 |
| Thioglycolic acid | 1.4 |
| Spotleak 1009 | 3.6 |
| Tinopal WGA | 0.4 |
| Crystal violet | 0.4 |
| Propylene glycol | Balance |

The fluid in the envelopes must possess an odor that remains stable and in solution for an indefinite period of time. The odor must be very pronounced and of a nature that can be detected immediately. The odor has the ability to remain in a localized area and the smallest envelope must contain a sufficient amount of fluid to persist for at least 72 hours under normal ventilating conditions. Moreover, the odor resists any chemicals that may be introduced into the envelope, such as by hypodermic needle, that would neutralize the odor to prevent its detection or to shorten its persistence. Finally, the odor has the ability to cling or penetrate into paper contained in the file, notwithstanding attempts to ventilate the area to evaporate it.

The dye in the solution, in addition to being stable for an indefinite period of time, is readily visible at a reasonable distance and resists attempts at its removal by any of the ordinary washing chemicals. Moreover, the dye, having fluorescent characteristics, is visible under infrared or ultraviolet light. The total fluid, including the odor, dye and basic solution, remains stable from −50° to 150° F. and is non-inflammable. In addition, the fluid is non-corrosive to the metal forming the envelopes 94–98 and does not emit any toxic gases when excessive heat is applied for entering the file, such as by a blowtorch attack. The fluid cannot be vaporized below 212° F. at atmospheric pressure, and when subject to reduced pressure (such as at about 15,000 feet) does not vaporize below 120° F. Finally, the fluid has a very low surface tension.

The envelopes 98 within the front panels of the drawers 2 and 3 differ somewhat from the quiltlike appearance of the other envelopes 94–97 in that the envelopes 98 are devoid of any spaced spot welds and wire mesh such as in the envelopes 94–97. The envelopes 98, having smaller side areas as shown in FIGS. 4, 11 and 12, are composed of two spaced metal sheets 109 and 110 having peripheral sealed borders 111 which provide a sealed chamber for containing odoriferous gas similar to that occupying the envelopes 94–97. Each envelope 98 is provided with a nipple 112 by which the gas is injected into the envelope from a compressed gas container.

As shown in FIGS. 2–7, the lock drawer 4 is not provided with an envelope in the front panel. Instead, the lock mechanism including the combination lock 20 and the toggle assembly 21 are enclosed within the lock housing including the lid portion 12 and body 13 which provide gas-confining chambers 113 and 114, respectively. As shown in FIG. 2, the lid portion 12 is provided with a pair of spaced notches 115 and 116 through which the shafts 7 and 10 extend. Inasmuch as the notches provide clearance space around each shaft, the coupling 24 having the flange 25 prevents manipulation of any part of the mechanism within the housing by insertion of a probe through the clearance space around the shaft 10. Likewise, the coupling 45 is provided with a flange 45*a* (FIG. 5) by which manipulation of any part of the mechanism within the housing may be prevented by inserting a probe through the clearance space around the shaft 7.

As shown in FIG. 7, the lid portion 12 and the body portion 13 have interfitting portions 117 and 118, respectively, which are maintained in position by the clamps 14, as shown in FIG. 2. Moreover, when the lock drawer 4 is in position as shown in FIG. 4, the lock mechanism within the housing is disposed between the upper and lower channel members 76 and 77 and the clearance between the top of the lid portion 12 and the upper channel member 76 is insufficient to permit removal of the lid 12 even with the clamps 14 omitted. Accordingly, it is impossible for the lock mechanism to be tampered with when the lock drawer 4 is in operating position. Finally, as shown in FIG. 4, the lid portion 12 is provided with similar openings 119 on opposite sides to permit lateral movement of the lift bolts 22 and 23 into and out of locking position.

The second embodiment of the invention is shown in FIGS. 10–26. The outward appearance of the second embodiment is the same as that of the first embodiment as shown in FIG. 1. The second embodiment differs from the first embodiment in that the combination lock and associated locking toggle system are built into the file and are not installed in a removable lock drawer such as the lock drawer 4 of the first embodiment.

The file of the second embodiment includes locking means generally indicated at 120 and includes a combination lock 121 and a lock toggle assembly 122. In addition, the locking means includes a pair of similar lock bars 123 disposed on opposite sides of the file.

Figure 15:
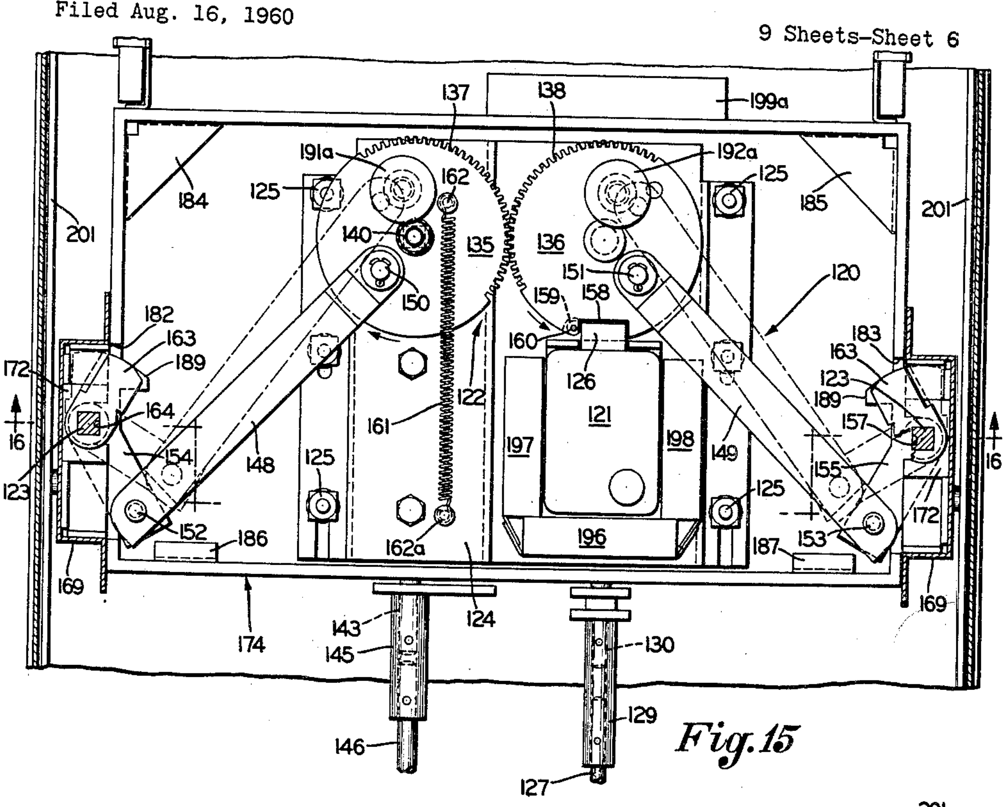
FIG. 15 is a horizontal sectional view of another embodiment of the lock assembly within the lock box with the lock box cover removed and showing the lock assembly in the locked position.
Figure 16:
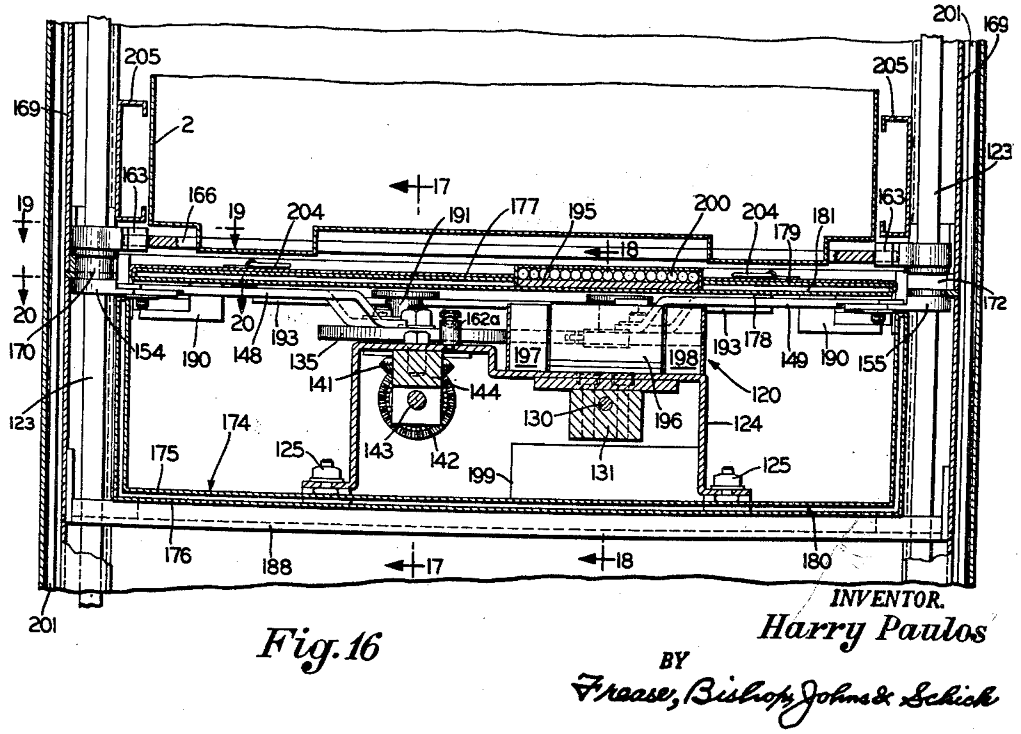
FIG. 16 is a vertical sectional view of the lock assembly taken on the line 16—16 of FIG. 15.

The combination lock 121 is a conventional manipulation-resistant combination lock similar to the lock 20. The lock 121 is mounted on a mounting bracket 124 that is secured in place by similar bolts 125, as shown in FIGS. 15 and 16. The lock 121 includes a bolt 126 that may be retracted or extended to the locking position by proper manipulation of a shaft 127 similar to the shaft 10 of the first embodiment.

Figure 18:
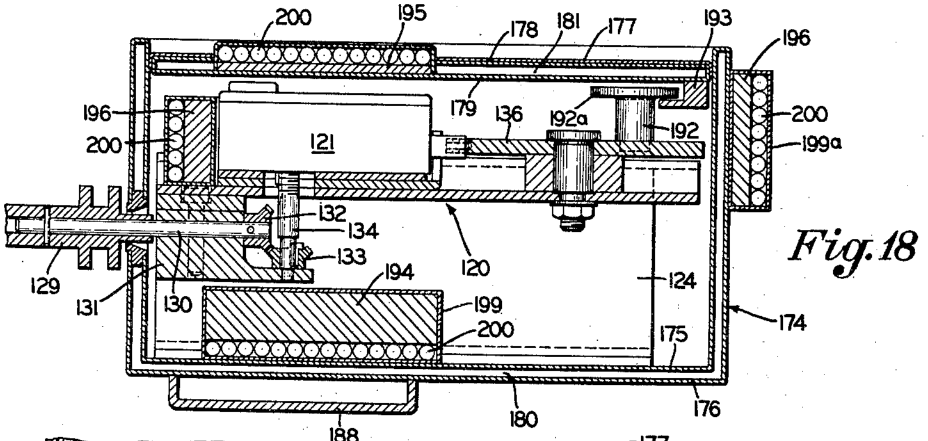
FIG. 18 is a vertical sectional view taken on the line 18—18 of FIG. 16.
Figure 21:
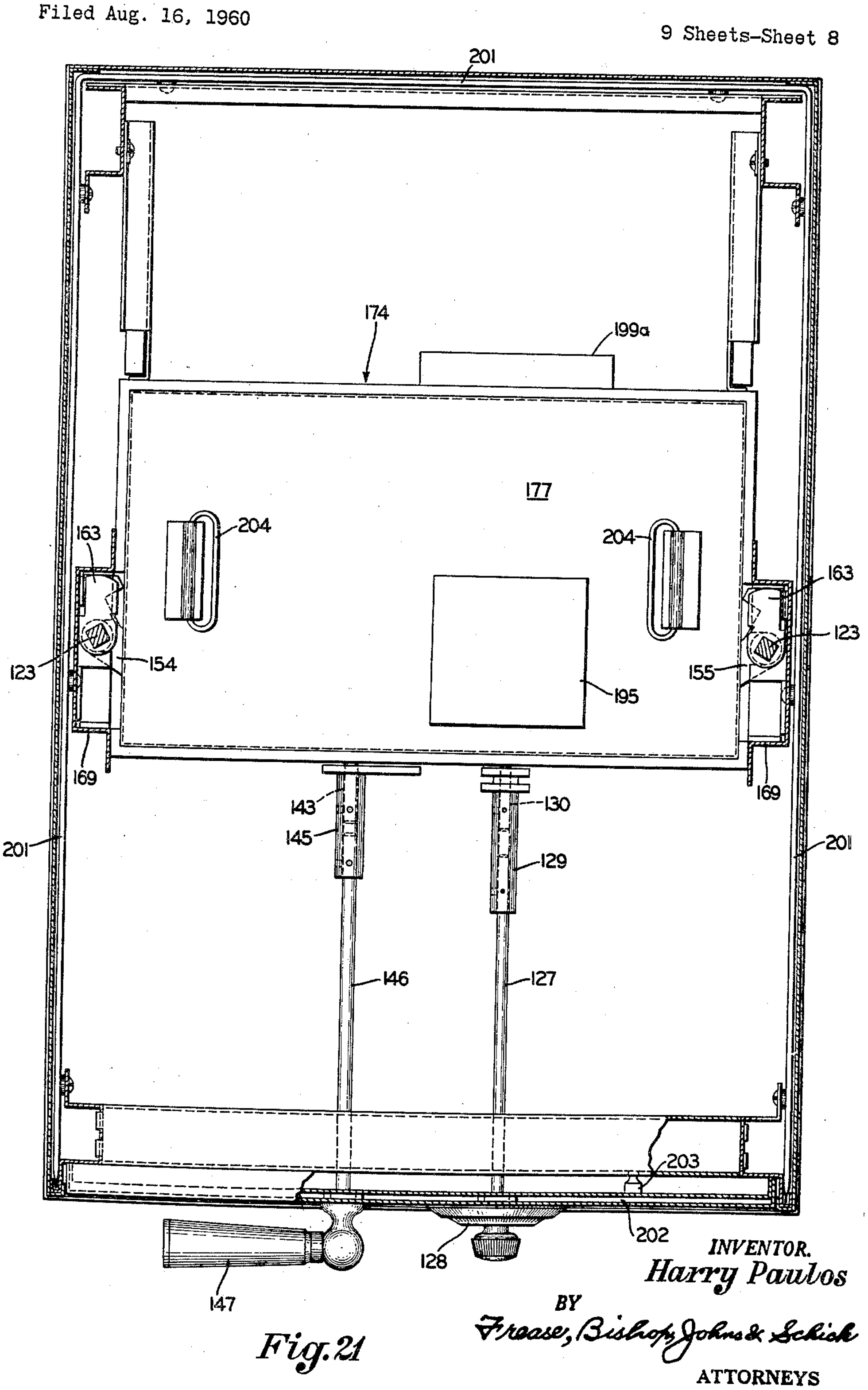
FIG. 21 is a horizontal sectional view through the second embodiment of the file container, showing the lid cover of the lock box in position and showing the lock lugs and handle in the unlocked positions.

As shown in FIG. 21, a dial spindle 128 is mounted on the outer end of the shaft 127. The inner end of the shaft is secured within one end of a coupling 129, the other end of which coupling is mounted on a shaft 130. As shown in FIG. 18, the shaft 130 extends through a member 131 secured to the under-surface of the bracket 124. On the inner end of the shaft 130 a gear 132 is mounted which engages a gear 133 which is mounted on the lower end of a shaft 134 of the lock 121. Accordingly, the lock spindle 128 is operatively connected to the combination lock 121.

As shown in FIG. 15, the toggle assembly 122 includes a pair of lock cams 135 and 136 having engaging peripheral gear portions 137 and 138, respectively. The lock cam 135 is mounted on a square pin 139, where it is held in place by a nut 140. In addition, a gear 141 is mounted on the shaft 139 below the cam 135, which gear engages a gear 142 fixedly mounted on one end of a shaft 143. The shaft 143 is journaled in a member 144 and the other end is provided with a coupling 145 by which the shaft is connected to an operating shaft 146 which, as shown in FIG. 21, extends through the front panel of the file where a handle 147 is mounted.

As shown in FIG. 15, the toggle system 122 also includes links 148 and 149 which are pivotally mounted by pins 150 and 151 on the cams 135 and 136, respectively. The other ends of the links 148 and 149 are pivotally connected by pins 152 and 153, respectively, to lock levers 154 and 155 which, having squared apertures 156 and 157, are mounted on the similar square shafts 123 on opposite sides of the file.

As shown in FIG. 15, the lock cam 136 has a peripheral notch 158 for receiving the extended lock bolt 126. At the left side of the notch 158 as viewed in FIG. 15, a roller 159 is mounted on a pin 160. The roller 159 engages one side of the bolt 126 to provide a minimum of friction between the cam 136 and the bolt when the bolt is retracted. Upon retraction of the bolt 126, the toggle system 122 is moved to the unlocked position by a coil spring 161, one end of which is secured at 162 to the cam 135, the lower end of which is secured at 162*a* to the bracket 124.

Figures 19, 20:
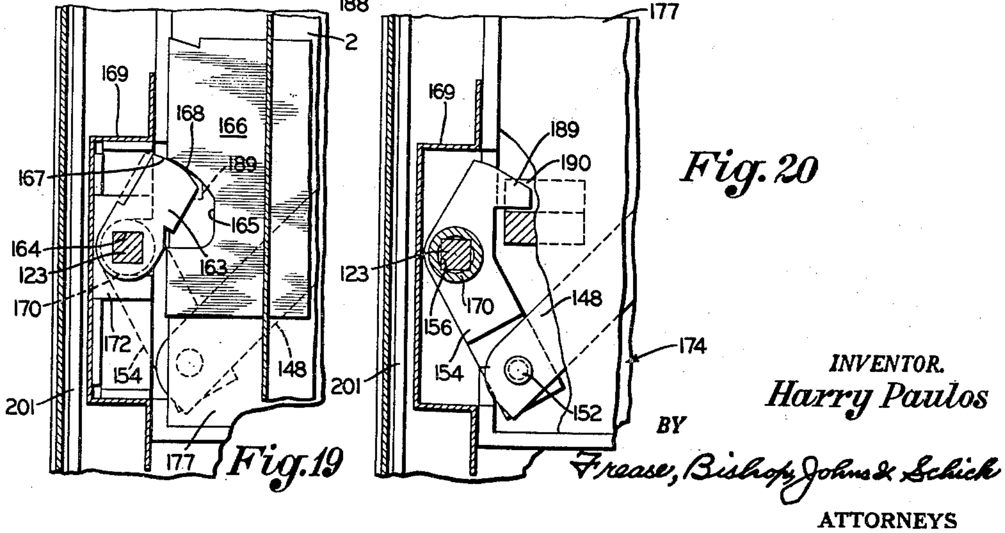
FIG. 19 is an enlarged fragmentary view of a lock lug in locking engagement with the lock plate on a drawer, taken on the line 19—19 of FIG. 16.
FIG. 20 is an enlarged fragmentary horizontal sectional view, taken on the line 20—20 of FIG. 16, showing a lock bolt in locking engagement with the lid of the lock box.

In FIG. 20 movement of the link 148 turns the lever 154, which action rotates the shaft 123 on which a plurality of spaced locking lugs 163 are mounted by square apertures 164. The number of lugs 163 is equal to the number of drawers in a file so that each lug 163 is rotatable from unlocked position (FIG. 21) to a locked position (FIG. 19) whereby each lug 163 moves into a lug-receiving notch 165 in a lock plate 166 which is attached at the undersurface (FIG. 16) of each drawer. As shown in FIG. 19, in the locked position each lug 163 having an arcuate outer end surface 167 moves into camming locking engagement with an arcuate portion 168 of the notch 165 and thereby prevents the plate 166, together with the drawer to which it is attached, from being withdrawn from the file.

Figure 22:
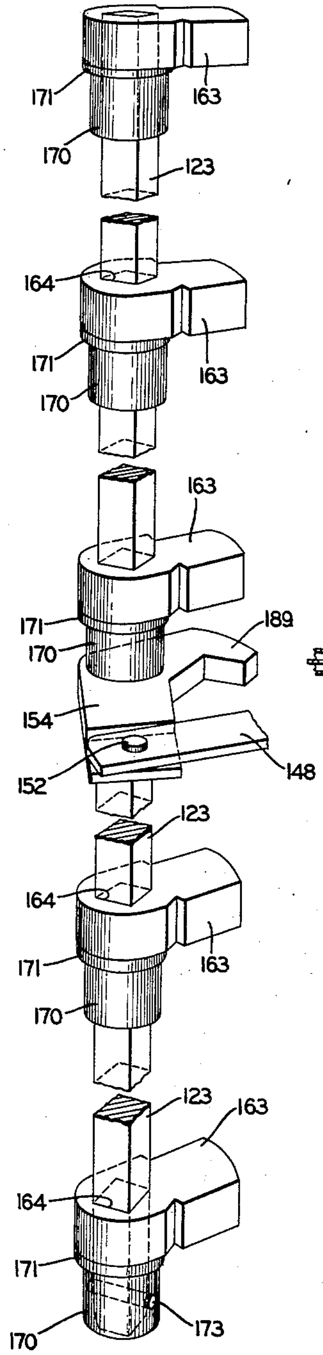
FIG. 22 is a perspective view of a lock bar having locking cams mounted at spaced intervals thereon for engagement with respective drawers of the file and showing the assembly in the locked position.

Each lock bar 123 is mounted within a vertical channel-shaped post 169 which reinforces the several parts of the file to provide a rigid structure. At spaced intervals within each post the lock bars 123 are provided with bearings 170 having an upper flange 171 by which each bearing is maintained at its vertical location on the bar. Each bearing 170 supports one locking lug 163 and the bearing rests on a bearing block 172 which is secured within the post 169. As shown in FIG. 22, the lowermost bearing 170 on each bar 123 is retained in place by a pin 173.

As shown in FIGS. 15, 16, 17, 18, and 21, the toggle system 122 and the combination lock 121 are located within a lock box 174 which is composed of spaced sheets 175 and 176 forming the body of the box as well as of a box cover 177 composed of sheets 178 and 179. The walls of the box 174 formed by the spaced sheets 175 and 176 provide a gas-containing chamber 180. Similarly, the sheets 178 and 179 of the lid 177 provide a chamber 181 for gas. Opposite side walls of the box 174 include notches 182 and 183 through which lock levers 154 and 155 extend, respectively. As shown in FIG. 15, the box 174 is provided at two corners with supporting brackets 184 and 185, as well as spaced cover supports 186 and 187 for supporting the cover 177 within the upper side of the lock box.

Figure 17:
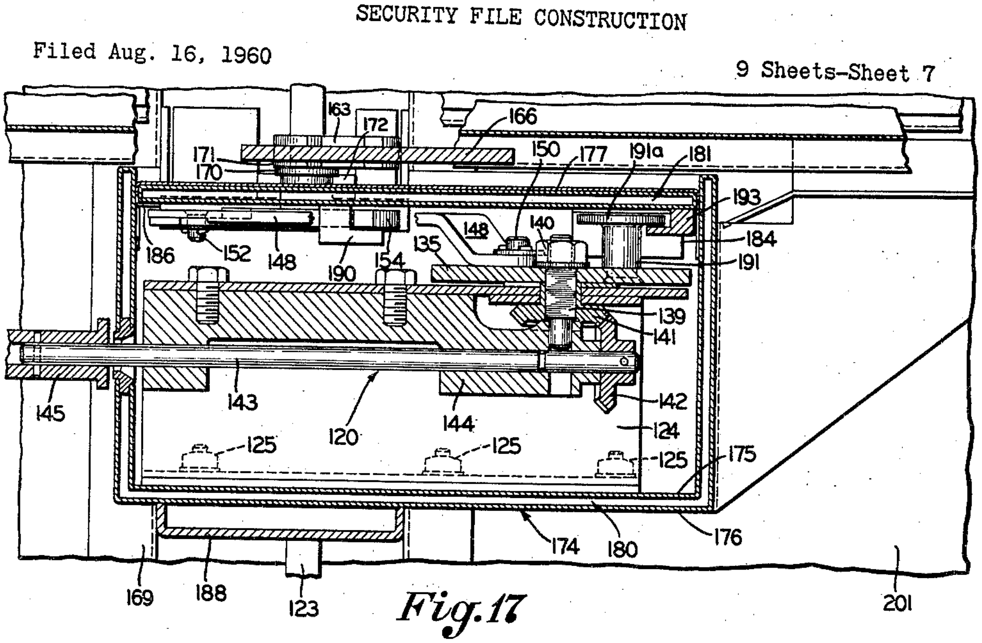
FIG. 17 is a vertical sectional view of the lock assembly, taken on the line 17—17 of FIG. 16.

As shown more particularly in FIGS. 16 and 17, the lock box 174 is secured in place between opposite vertical posts 169 and rests upon a horizontal reinforcing member 188 extending between said posts. When the file drawers are closed, the cover 177 is disposed directly below an upper drawer as shown in FIG. 16. With the file in the locked condition, the cover 177 is also locked in place by the toggle system. As shown in FIG. 20, the locking lever 154 includes a hook portion 189 which in the locked position moves into locking engagement with a locking bracket 190 attached to the undersurface of the cover 177. Similar locking brackets 190 are provided on opposite sides of the cover so that similar hook portions 189 operate to lock the cover in place.

In addition, the cover is provided with additional locking means including locking pins 191 and 192 mounted on the cams 135 and 136, respectively. As shown in FIGS. 17 and 18, the pins extending upwardly from the cams 135 and 136 are provided with radial flanges 191*a* and 192*a* which move into locking engagement with a bracket 193 attached to the undersurface of the cover 177. Accordingly, when the file is in the locked condition, the cover 177 is secured in place on the lock box 174.

Moreover, the lock box 174 is provided with lead shielding means around the combination lock 121 to prevent detection of the positions of the tumblers in the lock by radiographic methods. The lead shield means include lead blocks 194 and 195 below and above the lock 121 (FIG. 18) as well as a block 196 at one end as well as blocks 197 and 198 on opposite sides (FIG. 15) of the lock 121. As shown in FIG. 18, the blocks are contained within sheet metal housings such as the housing 199 for the block 194 and each housing also includes a layer of steel balls 200 which together with the lead blocks serve to defeat any attempt to radiograph the lock 121.

As shown in FIG. 21, the file is provided with a U-shaped envelope 201 having a construction and function similar to the envelopes 94–97 (FIG. 10) of the first embodiment. In addition, the panel of the file on which the lock spindle 128 and handle 147 are mounted is provided with an envelope 202 containing odoriferous gas and having a nipple 203 for filling the envelope with such gas.

An additional housing 199*a* for containing a lead block and steel balls is mounted on the back wall of the lock box 174, as shown in FIGS. 15 and 18.

The cover 177 (FIG. 21) is also provided with a pair of lift handles 204 by which access may be had to the locking means 120 when necessary. During normal use of the file the drawer 2 is mounted on similar tracks 205 on opposite sides, which tracks are attached to the vertical posts 169. By removing the drawer 2 the cover 177 may be removed from the lock box for purposes of maintaining the locking mechanism including the combination lock 121.

The device of the present invention avoids prior art difficulties by providing mechanical means for preventing surreptitious entry of a security file container. Among other things, the file is provided with a file locking system which includes a combination lock located at a position remote from any outer wall of the file and particularly spaced from the front panel of any file drawer in the file. More specifically, the combination lock together with its associated locking mechanism is substantially centrally disposed within the file and equally spaced from opposite walls thereof.

In addition, each file drawer is provided with a locking plate which prevents the locking of the file when one or more file drawers are open for a distance of less than three inches. That arbitrary dimension is assumed to be the maximum distance that a drawer can be left open inadvertently without being discovered. Moreover, the inner construction parts of the file around the drawer opening are preferably painted with a luminescent paint different from the exterior of the file so that when a drawer is left open for a distance of three or more inches, the fact that the drawer is open is readily evident.

The locking mechanism also includes a locking handle on the front wall of the file, which handle is spring-biased to the open position automatically when the combination lock is unlocked. On the other hand, the locking handle must be manually manipulated to the locked position when the file is locked, which act also requires that all file drawers be completely closed or left open beyond the three-inch open position. In other words, the file cannot be locked by the handle when one or more of the drawers is open for a distance less than three inches.

Furthermore, as shown and described, the design of and cooperative relation between the gang-locking means (the locking toggle mechanism, the drawer-engaging mechanism and the operating handle therefor), and the combination lock means, is such as to prevent the combination lock from being actuated to locking position unless the gang-lock means is in locking position.

Finally, the improved security file includes envelope means within and coextensive with all outer walls. The envelopes, being filled with an odoriferous colored fluid, act as barriers against a surreptitious entry of the file, because any entry of the file through any outer wall, or an entry other than by manipulation of the combination lock, must be through the envelopes, which will cause escape of the odoriferous fluid. The fluid is of such a composition that upon its escape from its envelope it permeates the entire area surrounding the file and cannot be readily eliminated by washing or ventilation within a reasonable time and thereby indicates to authorized personnel returning to the area that an attempt to enter the file has been made. Furthermore, each envelope is provided with a wire mesh having openings of approximately one inch contained within the envelope chamber for preventing penetration of the file through the envelope such as by pressing the envelope sheets together to prevent escape of the fluid when cutting an opening through the sheets.

Accordingly, maximum security protection is provided in the improved file construction by the combined and cooperative relationship of the location of the combination lock means within the file housing at the volumetric center of the housing, of the location of the gang-lock means midway between the front and rear of the file, of the primary enveloping protective barrier liner means for the perimeter of the container or housing which will be ruptured upon attempted entry into the housing to release fluid contained therein and thus signal an act of attempted entry into the housing, and of the secondary protective barrier means enveloping the combination lock means which also will be ruptured upon attempted access to the case of the combination lock means to release fluid contained therein and thus signal an act of attempted access to the combination lock means, per se.

However, it is to be understood that while maximum security may be obtained by the conjoint and cooperative arrangement of the central combination lock location, of the mid-way location of the gang-lock means, and of the primary and secondary protective barrier liner and signalling means; in those instances where the maximum degree of security may not be required, a greater degree of security than obtained with existing files may be obtained by the inclusion of any of the central combination lock location, or the mid-way location of the gang-lock means, or the primary or secondary protective barrier or signalling means, in a security container construction.

That is to say, from one aspect, the combination lock location substantially centrally of the file or at the volumetric center of the file housing, which controls and locks the gang-lock means, that is, the locking toggle means and the drawer-engaging members together with the operating handle therefor, presents a maximum obstacle to access to the combination lock for manipulation or destruction thereof.

From a different aspect, the location of the gang-locking bars 78 or 123 carrying the drawer-engaging hook portions 81 or locking lugs 163, substantially midway between the front and back of the file housing and preferably at each side thereof, presents a maximum obstacle to disengagement of the locking engagement of the gang-locking bars with the individual drawers when in locked position.

In prior file constructions where a gang-locking bar or a plurality of such bars are located at or adjacent the front portion of the file housing or near to the drawer fronts, and a wedge is inserted and driven in between an edge of a drawer front and a side wall of the housing the wedge will so spring or distort the housing or drawer as to cause disengagement of the locking bar connection with at least one of the drawers, permitting access to the file contents. This defeat measure is not applicable to the improved construction where the gang-locking bars are located midway between the front and back of the file housing because driving of a wedge between a housing side wall and a drawer front in the improved file cannot release the locking engagement of the gang-locking bars with the individual drawers.

From another aspect, the file perimeter and primary protective envelope means in which an odoriferous fluid is contained, provides a protective barrier liner and signalling means formed of easily ruptured or frangible material which will signal an act of attempted entry into the container lined therewith, whether or not the combination lock or the gang-locking means or the contents of the container have been reached, manipulated, tampered with or otherwise rendered insecure or available.

From still another aspect, the protective barrier signalling means enveloping the combination lock also formed of an easily ruptured or frangible material provides a secondary line of defense or signal of an act of attempted access to the combination lock.

Accordingly, any of the concepts or aspects of the invention may be used to achieve its individual objective; and the combined use of all concepts or aspects of the invention unitedly to a common end achieves the result of maximum security.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example and the scope of the present invention is not limited to the exact details of the construction shown.

Having now described the features, constructions and principles of the invention, the characteristics of the security file container and the advantageous, new and useful results provided; the new and useful discoveries, principles, parts, elements, combinations, subcombinations, structures and arrangements, and mechanical equivalents obvious to those skilled in the art are set forth in the appended claims.

What is claimed is:

1. A security file having opposite side, front, rear, top, and bottoms walls, the front wall having at least two drawer openings, a drawer disposed in each drawer openings, the drawers having a space therebetween, drawer locking means mounted in the space and including a combination lock having a lock bolt movable between locked and unlocked positions, the locking means also including a locking toggle operable between locked and unlocked positions corresponding to the positions of the lock bolt, the locking means also including drawer-engaging locking members operable between locked and unlocked positions in response to operation of the locking toggle, the combination lock being located substantially central of the file and remote from the front wall, the combination lock having operating means extending from the combination lock to and through the outer wall of the file, and file protective envelope means within the outer surfaces of the walls.

2. A security file having opposite side, front, rear, top, and bottom walls forming a housing cabinet, the front wall having at least two drawer openings, a drawer disposed in each drawer opening, drawer locking means disposed within the cabinet and including a combination lock disposed substantially centrally within the housing cabinet remote from the front wall, the lock having a lock bolt movable between locked and unlocked positions, the locking means also including interconnected members movable between locked and unlocked positions corresponding to each drawer in the cabinet, the combination lock having operating shaft means extending to and through the front wall of the cabinet, and protective envelope means contained within the outer surface of all walls forming the file.

3. A security file having opposite side, front, rear, top, and bottom walls, the file having a plurality of drawers, drawer locking means mounted between adjacent drawers and located substantially centrally between opposite walls of the file, the locking means including a combination lock having operating means extending to and through the front wall of the file, the locking means also including a locking toggle with drawer-engaging locking members movable between locking and unlocking positions, the toggle including a second operating shaft extending to and through the front wall of the file, an operating handle on the outer end of the second shaft, the combination lock having a locking bolt movable between locking and unlocking positions, the toggle and drawer-engaging locking members being movable between locking and unlocking positions corresponding to such positions of the lock bolt, and protective envelope means within the outer surfaces of the walls of the file.

4. A security file having opposite side, front, rear, top, and bottom walls, the file having a plurality of file drawers, a lock drawer detachably mounted centrally in the file between a pair of file drawers, drawer locking means mounted in the lock drawer and including a combination lock located substantially centrally between opposite walls of the file, an operating shaft extending from the combination lock to and through the front wall of the lock drawer, the locking means also including at least one bolt movable between extended locked and retracted unlocked positions, the bolt being operable by a second shaft extending to and through the front wall of the lock drawer, a handle on the outer end of the second shaft, the handle being movable between locked and unlocked positions corresponding to the combination lock, the locking means also including drawer-engaging locking members movable between locked and unlocked positions corresponding with the positions of the bolt, and protective envelope means within the outer surfaces of the walls of the file.

5. The security file construction set forth in claim 4 in which a protective envelope includes a pair of sheetlike members having edge portions sealed together completely around their peripheries, the envelopes forming a chamber filled with an odoriferous fluid, the sheetlike members being composed of an easily ruptured material, and in which the envelopes are co-extensive with the entire surface of the wall of the file including the front walls of the drawers.

6. A security file having opposite side, front, rear, top, and bottom walls, a plurality of file drawers in the file, a lock drawer disposed between two file drawers, a combination lock mounted in the lock drawer and spaced from the front wall and substantially centrally of the file, operating shaft means extending from the combination lock to and through the front wall of the lock drawer, the combination lock having a lock bolt movable between locking and unlocking positions, at least one lift bar extending outwardly from a side of the lock drawer and operatively connected to the lock bolt, a lock bar mounted between the drawers and at least one wall and movable vertically by the lift bar, a number of lock members on the lock bar corersponding to the number of file drawers, the lock members being movable between locked and unlocked positions corresponding to such positions of the lock bolt, and the lock bar being movable in response to movement of the lift bar between locked and unlocked positions.

7. The security file construction as set forth in claim 6 in which each wall of the file is provided with an envelope composed of a pair of sheetlike members having peripheral edges sealed together to form a dye-bearing odoriferous fluid-containing chamber, and in which the envelopes are coextensive with the walls, whereby an attempt to enter the file through a wall results in rupturing of the envelope and escape of the fluid.

8. The security file construction as set forth in claim 6 in which the assembly of the combination lock and lift bar is contained within a lock box including a body and a detachable cover which are composed of spaced sheets having peripheral edges sealed together in a fluid-tight manner and forming a chamber for an odoriferous dye fluid solution.

9. The security file construction as set forth in claim 8 in which the lock box body and cover have overlapping inter-fitting edges and in which said body and cover are disposed between file reinforcing members which are spaced from each other by a distance less than the completely expanded positions of the lock box body and cover.

10. The security file construction as set forth in claim 6 in which each lift bar has a notched end portion which moves into lock drawer locking engagement with one lock bar in the locked position.

11. A security file having opposite side, front, rear, top, and bottom walls, a plurality of file drawers in the file, a lock drawer disposed between two file drawers, a combination lock mounted in the lock drawer and spaced from side, front, and rear walls, operating shaft means extending from the combination lock to and through the front wall of the lock drawer, the combination lock having a lock bolt movable between locking and unlocking positions, a locking mechanism operatively connected with the lock bolt and including at least one lift bar located at a side of the lock drawer, the locking mechanism also including a vertical lock bar mounted between the drawers and a wall, the lift bar having a transverse member disposed in the path of movement of the lock bar, the lift bar having an inclined cam end portion movable into camming engagement with the transverse member, and a number of lock members on the lock bar corresponding to the number of file drawers and being movable into locking position with lock member receiving means on the drawers in response to lifting of the lock bar.

12. A security file having opposite side, front, rear, top, and bottom walls, a plurality of file drawers in the file, a locking mechanism including a combination lock mounted within the file and substantially equally spaced from opposite walls, a protective envelope between the file drawers and each adjacent wall, each envelope including a pair of sheetlike members having edge portions sealed together completely around their periphery and forming a chamber therebetween, each sheetlike member being composed of metal having a maximum thickness of about .009 inch, a wirelike network contained in the chamber and coextensive therewith, and the chamber being filled with an odoriferous fluid, whereby the wirelike mesh serves as a barrier against pressing the inner surfaces of the sheetlike members together in complete fluidtight contact and thereby provides a fluid excluded area between the sheetlike members through which an access opening may be made.

13. The security file construction as set forth in claim 12 in which the openings of the wirelike network are substantially one inch in diameter.

14. The security file construction as set forth in claim 12 in which the sheetlike members forming each envelope are spot welded together at locations substantially centrally of the openings in the network.

15. A security file having opposite side, front, rear, top, and bottom walls, a plurality of file drawers in the file, a combination lock centrally disposed within the file and substantially equally spaced from opposite walls thereof, means for manipulating the lock extending through one of the walls of the file, a protective envelope mounted between the drawers and each wall, each envelope including a pair of sheetlike members coextensive with each wall and having edge portions sealed together around the periphery forming a chamber between the members, the sheetlike members being composed of metal having a thickness of about .009 inch, a wirelike network enclosed within the chamber and coextensive therewith and having approximately one-inch openings in the network, and the chamber being filled with an odoriferous fluid, whereby the wirelike mesh serves as a barrier against pressing the inner surfaces of the sheetlike members together in complete fluidtight contact and thereby provides a fluid excluded area between the sheetlike members through which an access opening may be made.

16. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang-lock means for locking the drawers in closed position, combination lock means operably engageable with the gang-lock means to lock the gang-lock means in locking position, the combination lock means being located within the housing at the volumetric center of the housing, the rectangular box walls and the drawer front walls each including protective barrier liner means, the liner means including walls forming fluid vessel means coextensive with the housing walls, the liner vessel walls being formed of frangible material, and the fluid vessel means being filled with a signalling fluid, whereby rupture of any vessel wall upon attempted entry into the housing releases the fluid to signal an act of attempted entry into the housing.

17. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang-lock means for locking the drawers in closed position, combination lock means operably engageable with the gang-lock means to lock the gang-lock means in locking position, the combination lock means being located within the housing at the volumetric center of the housing, protective barrier and signalling means for the combination lock means within the housing, the barrier means including walls forming fluid vessel means enveloping the combination lock means, the vessel walls being formed of frangible material, and the fluid vessel means being filled with a signalling fluid, whereby rupture of any vessel wall upon attempt to gain access to the combination lock, releases the fluid to signal act of attempted access to the combination lock.

18. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang-lock means for locking the drawers in closed position, combination lock means operably engageable with the gang-lock means to lock the gang-lock means in locking position, and the combination lock means being located within the housing at the volumetric center of the housing.

19. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang-lock means for locking the drawers in closed position, combination lock means operably engageable with the gang-lock means to lock the gang-lock means in locking position, and the gang-lock means being located within the housing substantially midway between the drawer front walls and the rear box wall of the housing.

20. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang lock means for locking the drawers in closed position, combination lock means operably engageable with the gang-lock means to lock the gang-lock means in locking position, the gang-lock means being located within the housing substantially midway between the drawer front walls and the rear box wall of the housing, and the combination lock means being located within the housing at the volumetric center of the housing.

21. Multi-drawer security file construction including a six-sided file housing, rectangular box walls forming five sides of the file housing, a plurality of drawers removably mounted in the housing, the drawers each having a drawer front wall, the drawer front walls collectively forming the sixth side of the housing, gang-lock means for locking the drawers in closed position, combination lock means operably engageable with the gang-lock means to lock the gang-lock means in locking position, the gang-lock means being located within the housing substantially midway between the drawer front walls and the rear box wall of the housing, the rectangular box walls and the drawer front walls each including protective barrier liner means, the liner means including walls forming fluid vessel means coextensive with the housing walls, the liner vessel walls being formed of frangible material, and the fluid vessel means being filled with a signalling fluid, whereby rupture of any vessel wall upon attempted entry into the housing releases the fluid to signal an act of attempted entry into the housing.

22. A security file having protective wall means including side, front, rear, top and bottom walls, the front wall having at least one drawer-receiving opening, a drawer in the opening, drawer locking means mounted within the file and including a combination lock located substantially central of the file and spaced from all of said walls, and the combination lock having operating means extending from the lock to and through one of the walls of the file.

23. A security container having protective wall means including side, front, rear, top and bottom walls, the front wall having an access opening, closure means for the opening, closure locking means mounted within the container and including a lock located substantially central of the container and spaced from all of said walls, and the lock having operating means extending from the lock to and through one of the walls of the container.

References Cited in the file of this patent

UNITED STATES PATENTS

| | | |
|---|---|---|
| 137,456 | Little | Apr. 1, 1873 |
| 444,197 | Payne | Jan. 6, 1891 |
| 1,627,464 | Salamon | May 3, 1927 |
| 2,804,364 | Belew | Aug. 27, 1957 |
| 2,829,021 | Wolters | Apr. 1, 1958 |
| 2,887,965 | Henkel et al. | May 26, 1959 |
| 2,956,525 | Blauvelt | Oct. 18, 1960 |